(No Model.) 4 Sheets—Sheet 3.

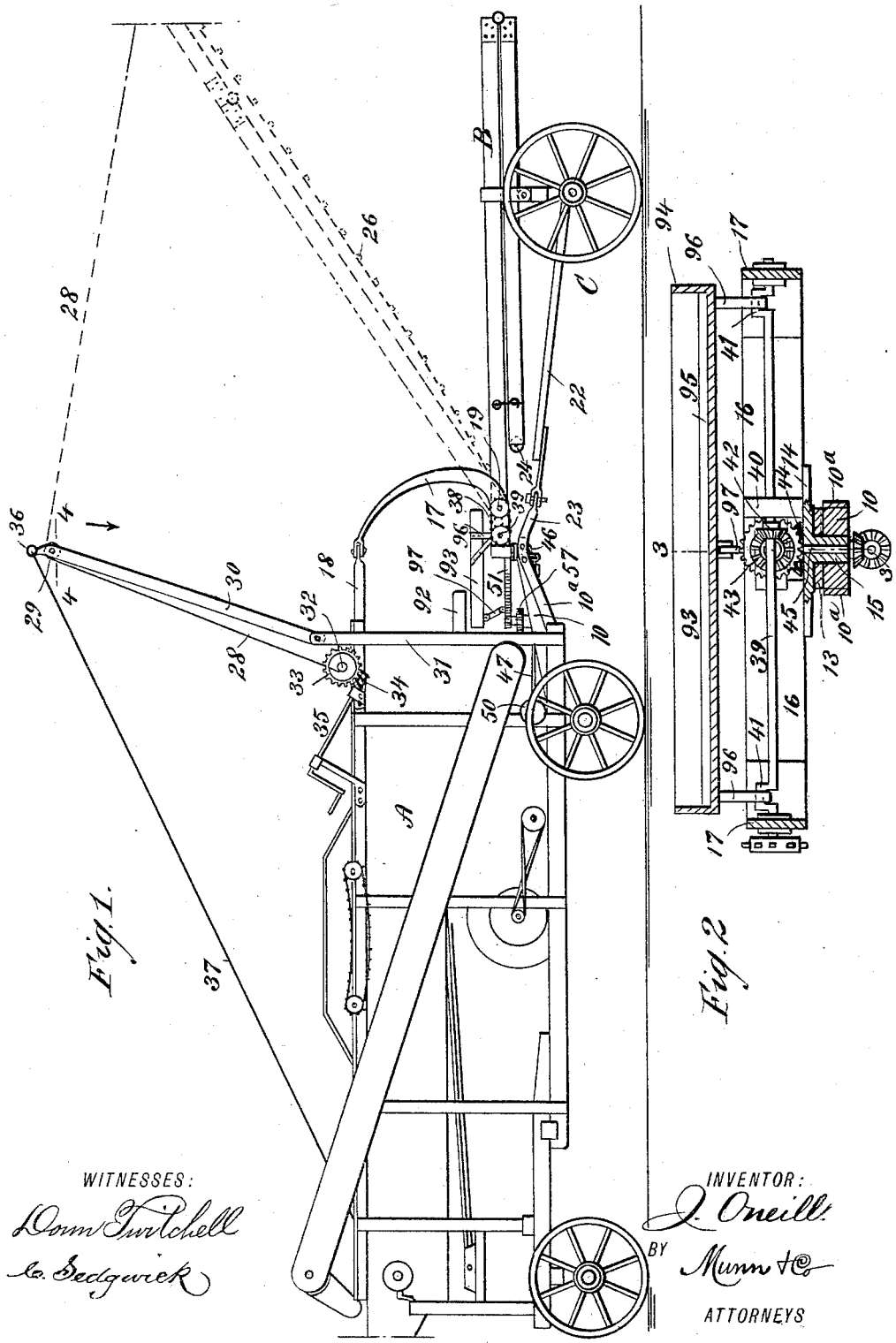

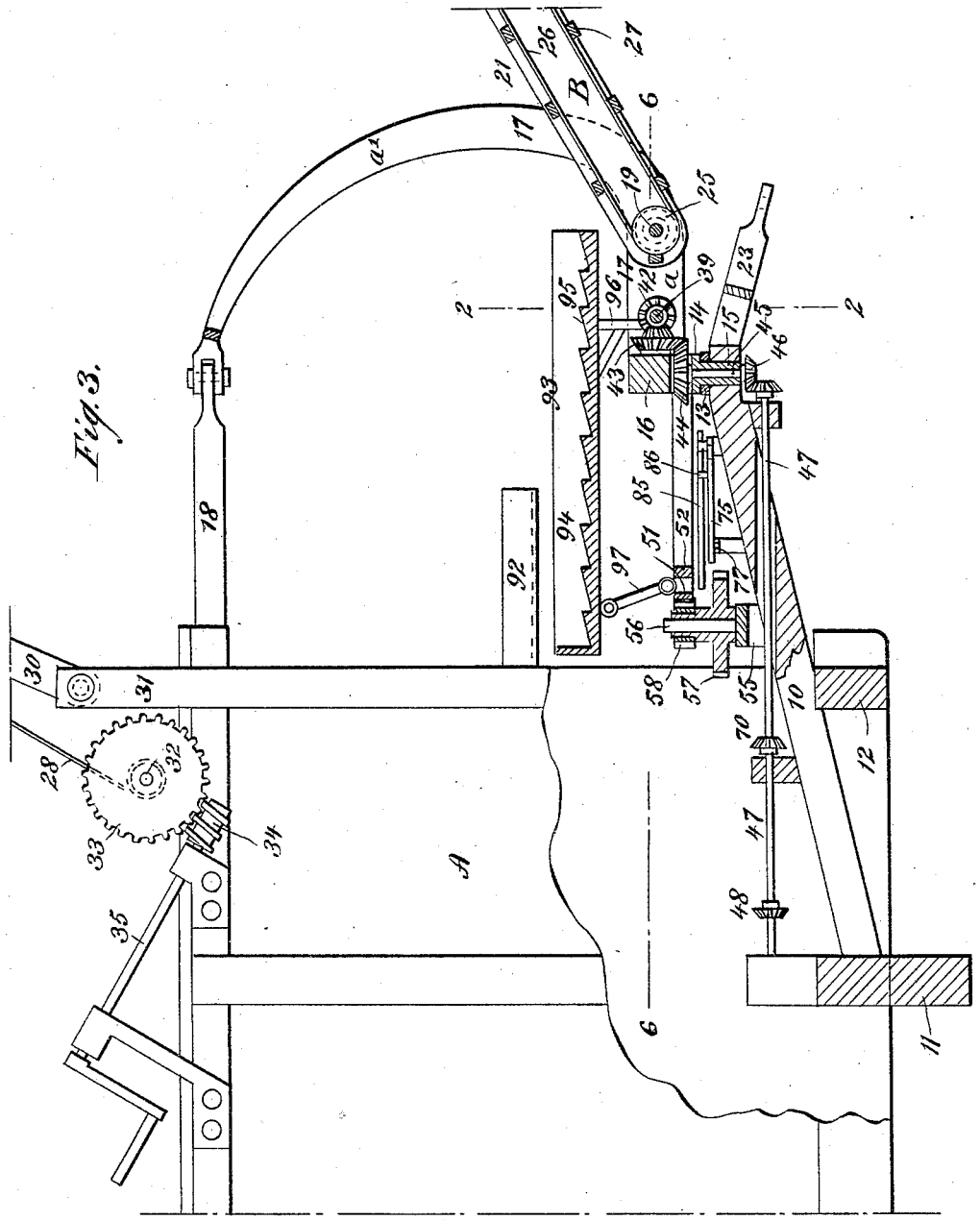

J. ONEILL.
STRAW STACKER.

No. 453,091. Patented May 26, 1891.

WITNESSES:
Donn Twitchell
C. Sedgwick

INVENTOR:
J. Oneill
BY Munn & Co.
ATTORNEYS

THE NORRIS PETERS CO., PHOTO-LITHO., WASHINGTON, D. C.

(No Model.) 4 Sheets—Sheet 4.

J. ONEILL.
STRAW STACKER.

No. 453,091. Patented May 26, 1891.

WITNESSES:
Donn Twitchell
C. Sedgwick

INVENTOR:
J. Oneill.
BY
Munn & Co
ATTORNEYS

UNITED STATES PATENT OFFICE.

JOHN ONEILL, OF PLAINVIEW, ILLINOIS.

STRAW-STACKER.

SPECIFICATION forming part of Letters Patent No. 453,091, dated May 26, 1891.

Application filed November 4, 1890. Serial No. 370,283. (No model.)

*To all whom it may concern:*

Be it known that I, JOHN ONEILL, of Plainview, in the county of Macoupin and State of Illinois, have invented a new and useful Improvement in Straw-Stackers, of which the following is a full, clear, and exact description.

My invention relates to an improvement in straw-stackers, and has for its object to provide an implement especially adapted for attachment to thrashing-machines or separators and to be carried thereby.

Another object of the invention is to construct a stacker of light weight, yet exceedingly durable, whereby when placed upon the thrasher it may be conveniently drawn over rough roads and up steep hills and handled generally with less labor than a stacker of the ordinary construction, as when the separator or thrasher is properly set up for work the stacker is adjusted also, the only additional labor being to unfold the elevator, which, when the implement is transported, is doubled upon itself to occupy a minimum of space.

Another object of the invention is to so construct the stacker that the elevator or conveyer may be manipulated to build a stack at one side of a fence, the implement being located at the other side.

The invention consists in the novel construction and combination of the several parts, as will be hereinafter fully set forth, and pointed out in the claims.

Reference is had to the accompanying drawings, forming a part of this specification, in which similar figures and letters of reference indicate corresponding parts in all the views.

Figure 4:
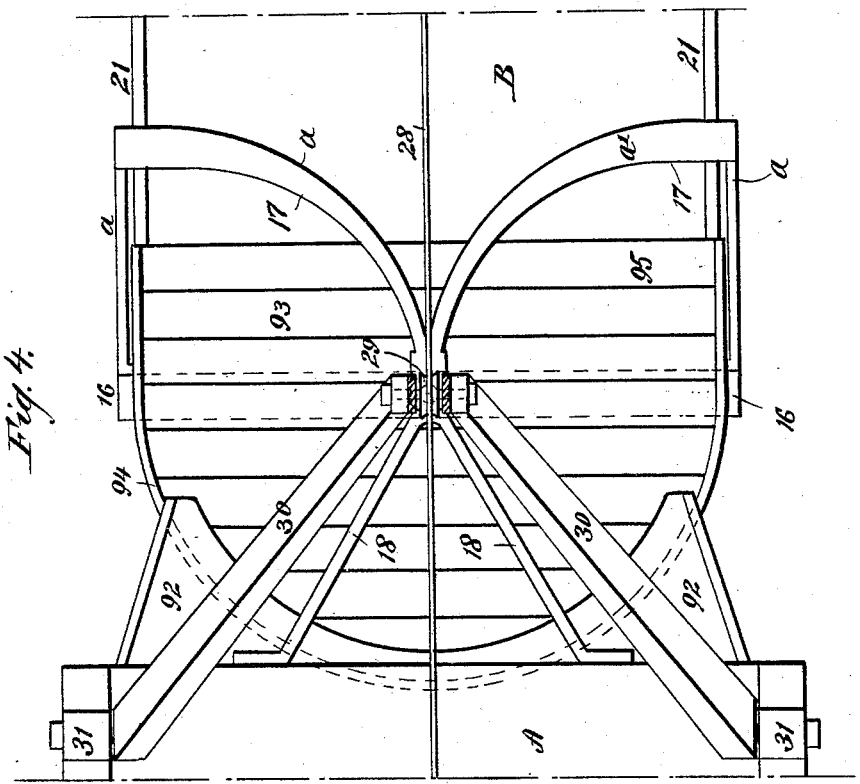
Figure 5:
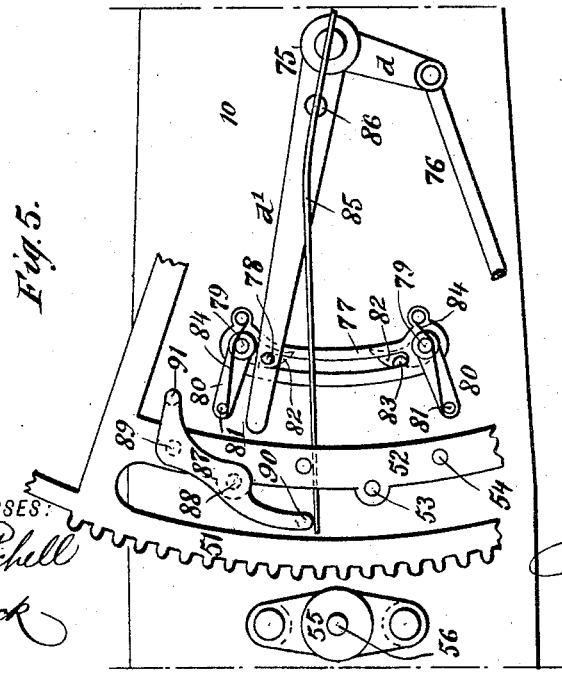
Figures 6, 7:
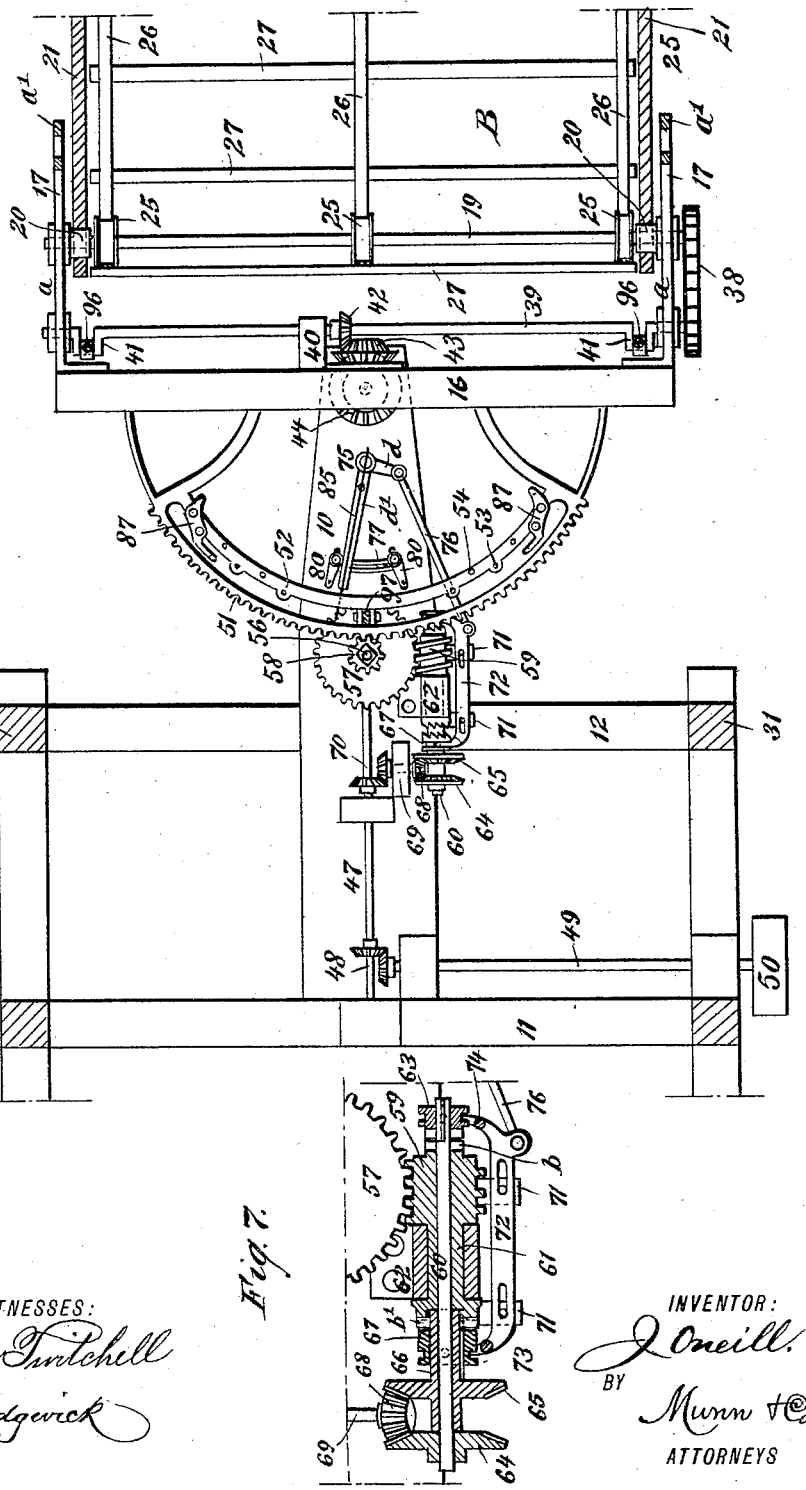

Figure 1 is a side elevation of the stacker applied to a thrasher. Fig. 2 is a transverse section taken practically on the line 2 2 of Fig. 3. Fig. 3 is a longitudinal section through the thrasher, taken practically upon the line 3 3 of Fig. 2, the thrasher to which the stacker is attached being shown partly in side elevation and partly broken away. Fig. 4 is a section taken on line 4 4 of Fig. 1, looking down upon the body of the thrasher. Fig. 5 is an enlarged plan view of the switching mechanism. Fig. 6 is a horizontal section taken practically on line 6 6 of Fig. 3 and showing the shifting and switching mechanisms in plan view, and Fig. 7 is an enlarged horizontal section through the shifting mechanism illustrated in plan view in Fig. 6.

A bed-plate 10, of wood or iron, is secured at its inner or forward end to a cross-beam 11, fastened between the sills of the thrasher near its rear end, which bed-plate is preferably wider at its inner than at its outer end, and is carried slightly upward and rearward beyond the thrasher, being supported at or near its center by a second cross-beam 12, and also ordinarily by braces $10^a$.

The bed-plate is adapted to support and carry the entire stacker, the construction of the stacker being substantially as follows: A transom-plate 13 is secured transversely upon the upper face of the bed-plate near its outer end, and in the transom-plate, at its center, an aperture is produced which registers with an opening in the bed, which extends completely through the same. A second transom-plate 14 rests upon the lower one and extends, preferably, some distance beyond the sides of the bed-plate. The upper transom-plate is revoluble and constitutes virtually a pivotal base for the stacker. To that end the upper transom-plate is provided with a sleeve 15 at the center of its under face, which sleeve extends downward through the opening in the fixed transom-plate and the registering opening in the bed-plate, as shown in Figs. 2 and 3. Upon the revoluble transom-plate a bolster-beam 16 is securely fastened, extending some distance beyond the sides of the bed-plate, and to the rear face of the bolster at each end a metal arm 17 is attached, constructed as light as possible consistent with strength. The arms extend at a right angle rearward from the bolster, forming a horizontal section $a$, and are further carried upward and forward, and the curved sections $a'$ thus formed converge gradually to such an extent that they virtually unite at their upper ends and are pivotally connected immediately over the pivot of the revoluble transom-plate, with a V-bracket 18 horizontally projected from the rear upper portion of the thrasher A, as shown in Figs 3 and 4. The arms 17 constitute a support for an elevator or conveyer B. To that end a shaft 19 is journaled in the arms at or near the rear portions of their horizontal sections $a$, as shown in Figs. 3 and 6. The shaft extends beyond one arm, the right-hand one preferably, and the projecting extremity has attached thereto a sprocket-wheel. Collars 20 are mounted upon the shaft just within the arms, which collars are rigidly attached to the arms and constitute a support and fulcrum for the lower ends of the elevator or conveyer side boards or beams 21.

The side boards or beams of the elevator or conveyer are made in two or more hinged sections, as shown in Fig. 1, whereby one section may be folded beneath the other when the stacker is not in use, and when thus folded the conveyer is preferably supported by a two-wheeled truck C, the tongue 22 of which is pivotally attached to a clevis 23, projected, ordinarily, rearward and downward from the bed-plate 10. Upon the shaft 19 flanged or grooved pulleys 25 are keyed or otherwise fastened, preferably three in number, one being located near each end and the other at or near the center of the shafts. Over the pulleys 19 and similar pulleys on a shaft at the upper end of the conveyer endless belts 26 are passed, the belts being connected in the usual manner by transverse slats 27 or their equivalents, arranged at suitable distances apart and in the usual manner, the belts and slats constituting the conveyer-apron. It is evident that the conveyer may be given a lateral movement in the direction of either side, as the upper transom-plate is its fulcrum, and the mechanism for accomplishing this movement will be hereinafter described. When the conveyer is in operative position, it is at an angle to the bed-plate, as shown in dotted lines in Fig. 1, the sections being in alignment and the outer end elevated. The upper end of the conveyer is raised or lowered, as desired, by a cord or chain 28, attached thereto, led over a pulley 29, journaled in the upper end of a derrick 30, the lower ends of which are pivoted or hinged to standards 31, projected from the thrasher, and the lower end of the cord or chain 28 is secured to a drum 32 or its equivalent, suitably journaled upon the top of the thrasher, as shown in Figs. 1 and 3, which drum may be rotated in any approved manner, usually, however, through the medium of a worm-wheel 33, attached to the drum and meshing with a worm 34 upon an inclined shaft 35, provided at one end with a crank or hand-wheel. The derrick is usually provided with a hook or eye 36 at its upper end, and is held in the elevated position by a stay rope or chain 37, secured to the hook at one end and to the forward end of the thrasher at its opposite end. The derrick is held at such an inclination that the center of its pulley will be immediately over the fulcrum of the stacker. By this means the weight is immediately upon the fulcrum, and friction is reduced to a minimum. The lower conveyer-shaft 19 is driven by a chain belt 38 passing over its sprocket-wheel and over a similar wheel upon the outer end of a parallel shaft 39, journaled in a horizontal hanger 40, attached to the bolster 16, and in the horizontal sections of the arms 17 near the bolster. The shaft 39 is adapted to revolve backward and is provided near each end with a crank-arm 41 and a bevel-pinion 42 near its center.

Upon a spindle secured to the bolster a double fixed miter-gear 43 is mounted, the rear face of which is of less diameter than the front face and meshes with the crank-shaft pinion 42. The front and larger face of the double gear meshes with a horizontal miter-gear 44, revolving in a recess of the bolster and securely attached to a short perpendicular shaft 45, journaled in the sleeve of the revoluble transom-plate, as shown in Figs. 2 and 3. The shaft 45 has a gear connection 46 with a horizontal line-shaft 47, the said shaft passing through the bed-plate, as shown in Fig. 3, and the line-shaft has a gear connection 48 with a drive-shaft 49, located at a right angle thereto, as illustrated in Fig. 6. The drive-shaft extends beyond one side of the thrasher and is provided with a pulley 50, capable of being belted to any convenient driving or driven shaft of the thrasher.

I will now describe the mechanism for laterally reciprocating the conveyer and for automatically reversing its movement. A segmental rack 51 is securely bolted to the front of the bolster 16, provided with an inner spaced concentric bar 52, containing two series of spaced apertures 53 and 54. A strap 55 is located over the opening in the bed-plate through which the line-shaft passes, and to said strap a pintle 56 is secured. The pintle is located in front of the rack at the center of the bed-plate, and upon it a worm-wheel 57 is loosely mounted, provided with an upwardly-extending rectangular hub, upon which a pinion 58 is slid, turning with the hub and meshing with the rack. When it is desired to move the conveyer by hand, the pinion is removed. The worm-wheel 57 meshes with a worm 59, loosely mounted upon a shaft 60, parallel with the line-shaft. The worm is provided with a hub 61, integral with its forward end, a portion of the hub being reduced in diameter to fit into a bearing 62, secured to the bed-plate 10. The body of the worm is provided with a clutch-face $b$, and its hub with a similar face $b'$, as is best shown in Fig. 7. Upon the rear end of the shaft 60 a sliding peripherally-grooved collar 63 is splined, provided with a clutch-face adapted for engagement with the clutch-face $b$ of the worm, and at the opposite or forward end of the shaft a bevel-gear 64 is secured. Near the bevel-gear 64 a second bevel-gear 65 is loosely mounted upon the shaft, provided with a hub 66, extending in one direction to the fixed gear 64 and in the other direction to the hub of the worm, and upon the latter section of the hub a sliding peripherally-grooved collar 67 is splined, having a clutch-face adapted for engagement with the face $b'$ of the worm-hub. Both of the bevel-gears 64 and 65 mesh with a bevel-pinion 68, whereby they are revolved in opposite directions, the said pinion being fast to one end of a short shaft 69, journaled in bearings upon the bed-plate and having at its opposite end a gear connection 70 with the line-shaft, as best shown in Fig. 6, the shafts being located one at a right angle to the other. Two arms 71 are projected outward from the outer face of the bed-plate, as is also best shown in Fig. 7, each being provided with an upwardly-extending pin. Upon the arms 71 a shifting plate 72 is held to slide, the said plate being provided in its body portion with elongated slots, through which the pins of the arms 71 extend, and the shifting plate is further provided at its ends with forks 73 and 74, the fork 74 engaging with the collar 63 of the shaft 60, and the fork 73 engaging with the collar 67 sliding upon the hub of the bevel-gear 65.

Within the segmental rack, which is of skeleton construction, an angle or elbow shifting-lever 75 is fulcrumed upon the bed-plate 10, as shown in Fig. 6, and enlarged in Fig. 5. One member of the lever is much shorter than the other, and the shorter member $d$ is connected by a link 76 with the shifting plate 72. The longer member $d'$ of the angle-lever extends over a segmental slotted plate 77, adapted to be elevated some little distance above the bed-plate 10, the longer member $d'$ of the shifting-lever being provided with a pin 78 upon its under face, which pin extends downward in the slot of the segmental slotted plate 77. At each end of the segmental plate 77 a pintle 79 is held to turn, each pintle being provided at its upper end with a horizontal arm 80, having a pin 81 projected upward therefrom at its outer end, and to the lower end of each pintle a curved arm 82 is secured, adapted to normally extend diagonally across the ends of the slot of the plate, as shown in Fig. 5, and each curved arm has produced in its convexed edge a cavity 83. The curved arms are normally held in the position just described by means of springs 84, which have a bearing against the pins 81 of the arms and their pintles, and studs placed at one side of the pintles, as is also best shown in Fig. 5. A spring 85 is placed edge down in a stud 86, attached to the upper face of the longer member of the shifting-lever, and the spring 85 is likewise secured at its rear end in the fulcrum of the lever, the said spring being of sufficient length to admit of its forward end extending virtually across the space intervening the rack 51 and the concentric bar 52. The lateral movement of the conveyer is limited in each direction by a curved striking-arm 87, one being located at each end of the rack-bar 52. The position of these arms may be changed, as they are provided in their under faces with two pins 88 and 89, which enter diagonally-opposite apertures 53 and 54 in the rack plate or bar 52. One extremity of each of the arms extends over the space between the rack and adjacent bar, and the other end extends beyond the inner edge of the bar. The said extremities of the arms are provided with downwardly-extending pins 90 and 91.

In operation, the conveyer having been carried to the left nearly the required distance, for instance, the shifting-lever and the striking arm at the left of the machine will be in substantially the position shown in Fig. 5, in which one end of the striking-arm is flexing the spring 85. When the rack is carried farther to the right, the opposite end of the striking-arm will engage with the pin 81 of the left-hand arm 80 and force said arm inward, thus causing its connected latch-arm 82 to release the pin 78 of the shifting-lever 75, whereupon the spring 85 being under severe tension, will force the member $d'$ of the shifting-lever to the right-hand side of the segmental slotted plate 77, and the pin of the lever will be caught and retained by the latch-arm 82 at the right of the segmental plate, while the short member of the shifting-lever will be carried rearward, causing the shifting plate 72 of the reversing mechanism to be carried in the same direction, and the collar 67 will engage with the worm-hub 61, causing the worm to reverse, and the rack at that moment will travel to the left, carrying the conveyer to the right. It is evident that by carrying the striking-arms 87 in the direction of the center of the rack the lateral throw of the conveyer will be shortened, and vice versa. A chute 92, preferably of light sheet metal and having a concaved outer end, is projected from and attached to the shoe of the thrasher, whereby the chute moves with the shoe and delivers the chaff and straw to a table 93 immediately beneath it, as best shown in Fig. 3. The rear end of the table is preferably convexed or circular, as shown in Fig. 4, and the sides and back are surrounded by an upwardly-extending flange 94, the upper face of the bottom of the table being provided with a series of transverse inclined ridges 95. The chaff-table is of a sufficient length to deliver the chaff directly upon the apron of the conveyer, and the table is adapted to be vertically reciprocated through the medium of legs 96, secured one at each side near the forward end, which legs are connected at their lower ends with the crank-arms 41 of the crank-shaft 39. The forward end of the chaff-table is supported by a single link 97, centrally located, which link has a pivoted connection with the table and also with the rack 51. By means of the connection of the table with the crank-shaft 39 and the link connection with the rack the table moves with the rack, and a vertical reciprocating movement and a lateral throw to and from the conveyer are obtained directly from the crank-shaft.

It is evident that a table having the movements above described will continually carry the chaff from its forward to its rear or delivery end and drop the same upon the conveyer beneath it. The chaff is prevented from moving backward after being thrown forward by reason of the peculiar construction of the floor or bottom of the table.

Having thus described my invention, I claim as new and desire to secure by Letters Patent—

1. In a stacker, the combination, with a support, of a frame pivoted to the support to swing horizontally, a conveyer pivoted in the frame to swing vertically, a line-shaft, means for reciprocating the said frame laterally, and means for operating the conveyer-belts from the line-shaft, substantially as described.

2. In a stacker, the combination, with a support, of a bolster pivoted to the support to swing in a horizontal plane and provided with forwardly-projecting arms, a conveyer-frame pivoted in the arms of the bolster to swing in a vertical plane, a shaft mounted in the said arms and geared with one of the conveyer-belt shafts, a line-shaft, means for laterally reciprocating the bolster and its arms, and means for operating the shaft geared with the conveyer-belt shaft from the line-shaft, substantially as described.

3. In a stacker, the combination, with a support projecting from a thrasher, of a bolster pivoted to the support to swing horizontally and provided with forwardly-projecting arms, a conveyer-frame pivoted to the said arms to swing vertically, a crank-shaft mounted in the arms of the bolster and geared with one of the conveyer-belt shafts, a chaff-table supported above the bolster and connected to the cranks of the said shaft, a line-shaft, and means for laterally reciprocating the bolster and operating the crank-shaft from the line-shaft, substantially as herein shown and described.

4. In a stacker, the combination, with a pivoted frame, of a segmental rack secured to the frame, means for operating the rack, pivoted arms carried by said rack, a clutch mechanism, a pivoted lever connected with the clutch mechanism, a spring secured to the said lever and adapted to engage the arms of the rack, and a locking mechanism for said pivoted lever, substantially as described.

5. In a stacker, the combination, with a pivoted frame, a slotted rack secured thereto, and means for operating the rack, of pivoted arms on the rack, a clutch mechanism, an elbow-lever having one arm connected to the clutch mechanism, a spring secured to one arm of the elbow-lever and adapted to engage the pivoted arm of the rack, and pivoted latch-arms adapted to engage the longer arm of the elbow-lever, substantially as herein shown and described.

6. In a stacker, the combination, with a pivoted frame carrying a conveyer, a slotted rack secured thereto, a pinion meshing with the rack, and means for operating the pinion, of pivoted striking-arms on the rack, a segmental slotted plate, an elbow-lever provided with a pin working in the slot of the segmental plate, a spring secured to one arm of the elbow-lever and adapted to engage the striking-arms of the rack, pivoted and spring-pressed latch-arms for engaging the pin of the arm of the elbow-lever, and a clutch mechanism connected with the short arm of the elbow-lever, substantially as herein shown and described.

7. The combination, with a thrasher or separator provided with a bed-plate projected rearwardly therefrom, a bolster pivoted upon the bed-plate, arms projected upward from the bolster and pivotally connected with the separator immediately above the pivot of the bolster, and a chute connected with the shoe of the separator, of a conveyer pivoted at its lower end in the bolster-arms, a reeling mechanism attached to the thrasher, a cable connection between the reeling mechanism and the conveyer, a rack projected from the bolster, and a driving and reversing mechanism connected with the rack and receiving motion from the driving mechanism of the thrasher, as and for the purpose specified.

8. The combination, with a thrasher having a bed-plate projected from the rear thereof, a bolster pivoted upon the bed-plate, arms projected outwardly and upwardly from the bolster and having their upper ends connected or pivotally attached to the thrasher, a chute connected with the shoe of the thrasher, and a conveyer pivoted at its lower end in the arms of the bolster, of a crank-shaft journaled between the bolster and the conveyer, a chaff-table located beneath the chute and extending over the conveyer, a rack projected from the bolster, legs projected from the chaff-table at one end and connected with the crank-shaft, a link connection between the opposite end of the table and the rack, and a driving and reversing mechanism connected with the rack and driven from the driving mechanism of the thrasher, as and for the purpose specified.

9. In a stacker of the character described, the combination, with a thrasher, a chute attached to the thrasher, and a bolster pivoted upon the thrasher to the rear of the chute and provided with upwardly-extending arms connected at their upper ends and pivotally secured to the thrasher over the pivot of the bolster, of a conveyer pivoted between the arms of the bolster, a boom pivoted upon the upper surface of the thrasher, the upper end of which when elevated is in vertical alignment with the pivot of the bolster and its arms, a reeling mechanism, a cable connecting the reeling mechanism and conveyer and supported and guided by the boom, and a reciprocating chaff-table located between the shoe-chute and conveyer and adapted to move under the former and over the latter, substantially as specified.

10. The combination, with a thrasher having a bed-plate projected from the rear thereof, a bolster pivoted upon the bed-plate, arms projected outwardly and upwardly from the bolster and having their upper ends pivotally attached to the thrasher immediately over the pivot of the bolster, and a conveyer pivoted at its lower end in the arms of the bolster, of a crank-shaft journaled between the bolster and conveyer, a chaff-table located beneath the chute, extending over the conveyer, and connected with the crank-shaft, a rack projected from the bolster, a link connection between the rack and chaff-table, an elevating mechanism carried by the thrasher and connected with the conveyer for elevating the latter, and a driving mechanism connected with the rack, substantially as shown and described.

11. In a stacker of the character described, the combination, with the driving mechanism of a thrasher, a conveyer pivotally connected with the thrasher, a segmental rack connected with the conveyer, a gear connection between the driving mechanism of the thrasher and the rack, and a reversing mechanism, also geared to the driving mechanism of the thrasher, of a segmental guide-plate located near the rack, spring-controlled latch-carrying arms journaled in the ends of the plate, an angular spring-pressed shifting-lever, one member of which extends over the plate, the other being linked to the reversing mechanism, and striking-arms adjustably connected with the rack, adapted for engagement with the spring of the shifting-lever and the pivoted arms of the segmental plate, as and for the purpose set forth.

JOHN ONEILL.

Witnesses:
C. H. BILLINGS,
JNO. W. FARAGHER.